W. HARLES.
Excavating Carts.
No. 135,546. Patented Feb. 4, 1873.
Fig. 1.
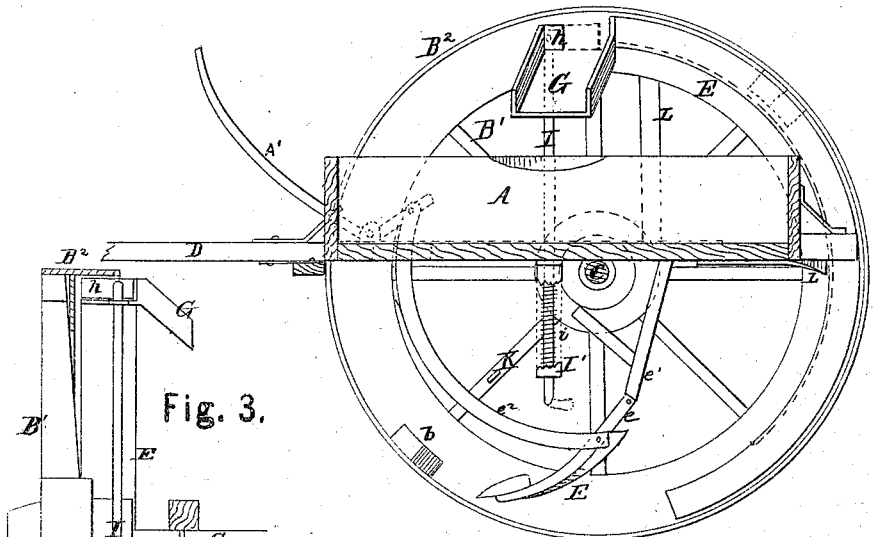
Fig. 2.
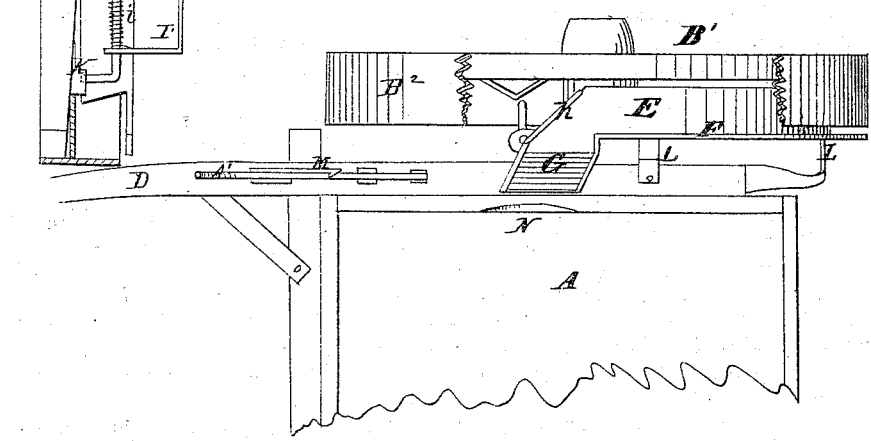
WITNESSES.
G. E. Upham.
Phil. C. Masi.
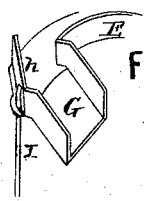
Fig. 4.
INVENTOR.
William Harles.
Chipman Hosmer & Co
Attys

UNITED STATES PATENT OFFICE.

WILLIAM HARLES, OF WASHINGTON, MISSOURI.

IMPROVEMENT IN EXCAVATING-CARTS.

Specification forming part of Letters Patent No. 135,546, dated February 4, 1873.

*To all whom it may concern:*

Be it known that I, WILLIAM HARLES, of Washington, in the county of Franklin and State of Missouri, have invented a new and valuable Improvement in Carts; and I do hereby declare that the following is a full, clear, and exact description of the construction and operation of the same, reference being had to the annexed drawing making a part of this specification, and to the letters and figures of reference marked thereon.

Figure 1 of the drawing is a representation of a vertical longitudinal section of my invention. Fig. 2 is a sectional view of the same. Figs. 3 and 4 are details.

This invention has relation to carts; and consists in the construction and novel arrangement of devices by means of which the cart is enabled to load itself with earth automatically, as hereinafter described.

My invention is chiefly applicable to carts used for removing earth from excavations, roads, &c.

In the drawing, A represents the body of the cart, $B^1$ the wheels, and C the axle, upon which rest the rear ends of the shafts D. One of the wheels $B^1$, as will be seen, is provided with a wide rim, $B^2$, projecting inwardly, and adapted to receive the earth from a scooping-plow, E. The plow-beam $e$ is pivoted to a standard, $e^1$, depending from one of the shafts, and is also pivoted to a curved arm, $e^2$, passing through a slot in the same shaft, and connected above it to the small arm of an elbow-lever, $A'$, used by the driver for raising and lowering the plow. Around the rim of the wheel $B^1$ is arranged a number of buckets, $b$, which carry the earth above the top of the cart-body when the wheels turn forward. E indicates a casing, consisting of a plate bent to a semicircular form, placed within the compass of the broad tire behind the axle, and concentric with said tire. This plate is provided with a flange, F, which fits close to the edge of the broad tire. The earth, in being raised, passes through the space inclosed by the flanged plate or casing, wheel-rim, and broad tire, and is delivered to the cart through an inclined spout, G, formed at the upper end of the flanged casing. At said upper end of the casing is arranged a gate, $h$. This gate is secured to a vertical rod, I, journaled in a bracket, $I'$, and encircled by a spring, $i$. This spring has one end secured to the bracket $I'$ and the other to the rod I. The rod I has a finger or projection formed at its lower end by bending the same outward in the direction of the wheel $B^1$, from some of the spokes of which project studs K, which, when the wheel revolves, come in contact with the projection on the lower end of the rod I, thereby turning said rod, and, at the same time, causing the gate $h$ to be swung toward the spout G.

When the rod is turned by one of the studs K the spring is tightened around the former; but as soon as the stud passes by the lower end of the rod the spring immediately reacts, and thereby turns the rod back to its original position, and with it the gate, thus closing the latter.

As will be noticed, the faces of the buckets are placed obliquely. The reason will be presently explained.

The relation of the buckets to the studs K is such that when a bucket loaded with earth has nearly reached the gate $h$, the latter then closing the end of the casing, the gate will, by the action of one of the studs K, be turned toward said bucket, and, while scraping the earth from the bucket into the spout, will allow said bucket to pass by. As soon as this action is completed the spring immediately carries the gate back to its original position.

L represents arms attaching the casing E to the cart-frame. M is a dog holding the lever $A'$ in position. N is a channel cut in the side of the cart to let the load fall in easily.

What I claim as my invention, and desire to secure by Letters Patent, is—

1. The flanged casing E and spout G, in combination with the wheel $B^1$ having the broad tire $B^2$ and buckets $b$, substantially as specified.

2. A wagon or cart having the wheel $B^1$ with broad tire $B^2$, buckets $b$, and studs K, the flanged casing E, spout G, gate $h$, rod I, and spring $i$, substantially as specified.

In testimony that I claim the above I have hereunto subscribed my name in the presence of two witnesses.

WILLIAM HARLES.

Witnesses:
ANDREW GRUNEWOLD,
JOHN MORROW.